United States Patent
Yin et al.

(10) Patent No.: US 10,878,197 B2
(45) Date of Patent: Dec. 29, 2020

(54) SELF-LEARNING USER INTERFACE WITH IMAGE-PROCESSED QA-PAIR CORPUS

(71) Applicant: International Business Machines Corporation, Armonk, NY (US)

(72) Inventors: Kun Yan Yin, Ningbo (CN); He Li, Beijing (CN); Yuan Lin Yang, Beijing (CN); Jian Hui Bj Chen, Ningbo (CN); Shun Sp Wen, Ningbo (CN); Zhong Fang Yuan, Ningbo (CN)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 16/201,210

(22) Filed: Nov. 27, 2018

(65) Prior Publication Data

US 2020/0167420 A1 May 28, 2020

(51) Int. Cl.
*G06F 17/27* (2006.01)
*G06F 40/30* (2020.01)
*G06N 20/00* (2019.01)

(52) U.S. Cl.
CPC ............. *G06F 40/30* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,706,450 | B1* | 7/2020 | Tavernier | G06N 20/00 |
| 2004/0202992 | A1* | 10/2004 | Moulthrop | G06K 9/033 |
| | | | | 434/353 |
| 2010/0063797 | A1 | 3/2010 | Cong et al. | |

(Continued)

FOREIGN PATENT DOCUMENTS

CN 106844530 6/2017

OTHER PUBLICATIONS

Cong et al., Finding question-answer pairs from online forums, Singapore, Singapore—Jul. 20-4, 2008 ACM New York, NY, USA © 2008, table of contents ISBN: 978-1-60558-164-4 doi>10.1145/1390334.1390415, 3 pages.

Wang et a., Extracting Chinese question-answer pairs from online forums, Published in: 2009 IEEE International Conference on Systems, Man and Cybernetics, Date of Conference: Oct. 11-14, 2009, Date Added to IEEE Xplore: Dec. 4, 2009, Inspec Accession No. 11004738, DOI: 10.1109/ICSMC.2009.5345956, 3 pages.

(Continued)

*Primary Examiner* — Satwant K Singh
(74) *Attorney, Agent, or Firm* — Schmeiser, Olsen & Watts; Christopher M. Pignato

(57) ABSTRACT

A machine-learning component of a conversational user-interface system retrieves records of human question-and-answer sessions from heterogenous sources. A sequence of image-processing operations converts each source into a set of grayscale images. Each image is segmented into disjoint sections as a function of the textures, edges, and contours that make up the image's content. Each section is tagged with a vector of parametric values that identify characteristics of the section's content from which may be inferred semantic meaning. A cognitive function intelligently analyzes the vectors to classify each section as containing a question, an answer to a question, non-textual media, or other types of content. Another cognitive function merges and organizes the sections into question-answer pairs and the vectors associated with each pair are stored in a corpus that is submitted to the self-learning user interface during a machine-learning training session.

19 Claims, 7 Drawing Sheets

(56) References Cited

U.S. PATENT DOCUMENTS

| | | | |
|---|---|---|---|
| 2010/0201114 A1* | 8/2010 | Fields | B42D 25/29 |
| | | | 283/70 |
| 2011/0125734 A1 | 5/2011 | Duboue et al. | |
| 2017/0235841 A1 | 8/2017 | Li et al. | |
| 2019/0347319 A1* | 11/2019 | Goyal | G06F 40/174 |
| 2020/0065394 A1* | 2/2020 | Calderon | G06K 9/00302 |

OTHER PUBLICATIONS

Malik et al., Contour and Texture Analysis for Image Segmentation, International Journal of Computer Vision 43(1), Jul. 27, 2001, 2001 Kluwer Academic Publishers. Manufactured in The Netherlands., Computer Science Division, University of California at Berkeley, Berkeley, CA 94720-1776, USA, Revised Feb. 23, 2001; Accepted Feb. 23, 2001, 21 pages.

* cited by examiner

SELF-LEARNING USER INTERFACE WITH IMAGE-PROCESSED QA-PAIR CORPUS

BACKGROUND

The present invention relates in general to self-learning computer software and in particular to using machine-learning technology to train a self-learning user interface to emulate human question-and-answer conversations.

An artificially intelligent interactive user-interface system tries to respond to user questions with answers like those that the user would expect from a human respondent. Such a system generally learns how to respond by analyzing question-and-answer pairs generated during actual interactions between human parties. This learning procedure may include submitting the question-and-answer pairs to the self-learning system as vectors incorporated into a corpus during a machine-learning training session.

Known conversational interfaces may interact with users through question-answer pairs. A question answer pair (QAP) is implemented by computer code that identifies natural language corresponding to a human-understandable question and a human-understandable answer, where the answer can be derived from a source text. For example, a source text that states: "Yams are delicious," would typically result in a QAP: "Q: What is delicious?; A: Yams." It is known that a QAP may be generated from source text either through human effort (for example, through a process like crowdsourcing) or may be generated automatically by operation of software.

Question-and-answer pairs may be derived from many types of sources, such as from customer-service chat logs, questions posted on a product page of an e-commerce site, a published article, an email thread, a social media conversation, or a recording of a service call.

The contents of these sources may be stored or recorded in file formats, data formats, or storage formats that are incompatible with each other or incompatible with a format needed to store those contents in a machine-learning corpus. For example, a first source could be a .PDF file, a second source an HTML-formatted Web page, and a third source a word-processor file.

The presentations and internal layouts of these sources may also be inconsistent. Headings, indentations, fonts, colors, margins, embedded media or graphical content, and other textual and page-layout parameters may differ, and two sources may be structured so differently that a method of accurately identifying or extracting a question or an answer from one source unable to reliably accomplish the same task with a second source. Contextual cues that allow questions and answers to be identified and delimited can differ greatly. In some cases, unrelated images, videos, hypertext links, and other types of non-textual content must be also distinguished from a question and or answer that itself contains non-textual content.

Known current methods of extracting question-answer pairs from heterogeneous sources generally comprise complex multi-technology procedures. For example, some solutions first use a set of front-end applications, each designed to handle a particular type of source, to translate each source into a format that is compatible with OCR (optical character recognition) processing, and then use OCR to identify alphanumeric characters in each translated document. Other solutions add a cognitive or pattern-matching module that attempts to identify question-and-answer pairs in the OCR output.

Parsing applications capable of extracting semantically meaningful content from a particular document format have been developed by third-party software vendors, but such parsers exist for only a limited number of formats. Furthermore, most formats do not include metadata from which "question" and "answer" labels may be inferred and used to identify which sections of a file should be interpreted as being a question-answer pair.

Known training applications, even those that are themselves based on machine-learning technology, identify question-answer pairs with less than 70% accuracy and require custom parsing or translation applications written specifically for each source format. Known systems do not automatically reformat identified question-answer pairs into a standard vector format compatible with formats used by machine-learning corpora. Deriving reliable machine-learning Q-A training data from a variety of information sources thus requires a human expert to at least review and manually correct automatically identified QA pairs. Known machine-learning technology must therefore comprise manual steps and proprietary, source-format-specific applications in order to generate corpora suitable for training a self-learning application.

SUMMARY

An embodiment of the present invention is a computerized system that includes a processor, a memory coupled to the processor, and a computer-readable hardware storage device coupled to the processor, the storage device containing program code configured to be run by the processor via the memory to implement a method for a self-learning natural-language user interface with an image-processed corpus. The system identifies a grayscale image representing at least part of a source document that contains a record of natural-language question-and-answer conversations, including questions and answers. The system segments the grayscale image into a set of blocks that are each characterized by an image texture. The system associates each block with a vector that stores values that describe the semantic meaning of content represented by the corresponding block and then uses artificial intelligence to classify each block as containing a natural-language question, a natural-language answer to a question, or non-textual content. Each block's classification is based on the vector describing that particular block. The system then uses another cognitive function to organize the blocks into question-answer pairs and loads the corresponding vectors into a machine-learning corpus that is later used to train the interface to better conduct natural-language question-and-answer sessions with users.

Another embodiment of the present invention is a method for a self-learning user interface with image-processed QAP corpus. The system identifies a grayscale image representing at least part of a source document that contains a record of natural-language question-and-answer conversations, including questions and answers. The system segments the grayscale image into a set of blocks that are each characterized by an image texture. The system associates each block with a vector that stores values that describe the semantic meaning of content represented by the corresponding block and then uses artificial intelligence to classify each block as containing a natural-language question, a natural-language answer to a question, or non-textual content. Each block's classification is based on the vector describing that particular block. The system then uses another cognitive function to organize the blocks into question-answer pairs and loads the corresponding vectors into a machine-learning corpus that is later used to train the interface to better conduct natural-language question-and-answer sessions with users.

Yet another embodiment of the present invention is a computer program product including a computer-readable storage medium storing computer-readable program code that is compatible with a self-learning user interface system that includes a processor, a memory coupled to the processor, and a computer-readable hardware storage device coupled to the processor. The stored program code is configured to be run by the processor via the memory to perform a method for a self-learning user interface with image-processed QAP corpus. The system identifies a grayscale image representing at least part of a source document that contains a record of natural-language question-and-answer conversations, including questions and answers. The system segments the grayscale image into a set of blocks that are each characterized by an image texture. The system associates each block with a vector that stores values that describe the semantic meaning of content represented by the corresponding block and then uses artificial intelligence to classify each block as containing a natural-language question, a natural-language answer to a question, or non-textual content. Each block's classification is based on the vector describing that particular block. The system then uses another cognitive function to organize the blocks into question-answer pairs and loads the corresponding vectors into a machine-learning corpus that is later used to train the interface to better conduct natural-language question-and-answer sessions with users.

According to an aspect of the present invention there is a computer implemented method, computer program product and/or computer system for performing the following operations (not necessarily in the following order): (i) receiving a source document bitmap with the bitmap including a representation of natural language text that includes at least a first question and a first answer, with the first answer being responsive to the first question; (ii) dividing the source document bitmap into a plurality of blocks based upon an analysis of image textures of various portions of the source document bitmap; (iii) determining that a first block of the plurality of blocks includes a representation of a first question; (iv) determining that a second block of the plurality of blocks includes a representation of an answer to the first question: (v) determining a first vector for the first block, with the first vector including a plurality of parameter values; (vi) determining a second vector for the second block, with the second vector including a plurality of parameter values; (vii) organizing the first block and the second block into a first question-answer pair (QAP); (viii) storing the first QAP, and its associated first and second vectors, in a machine-learning corpus; and (ix) training a machine learning system based, at least in part, upon the first QAP, the first vector and the second vector.

DETAILED DESCRIPTION

Figure 1:
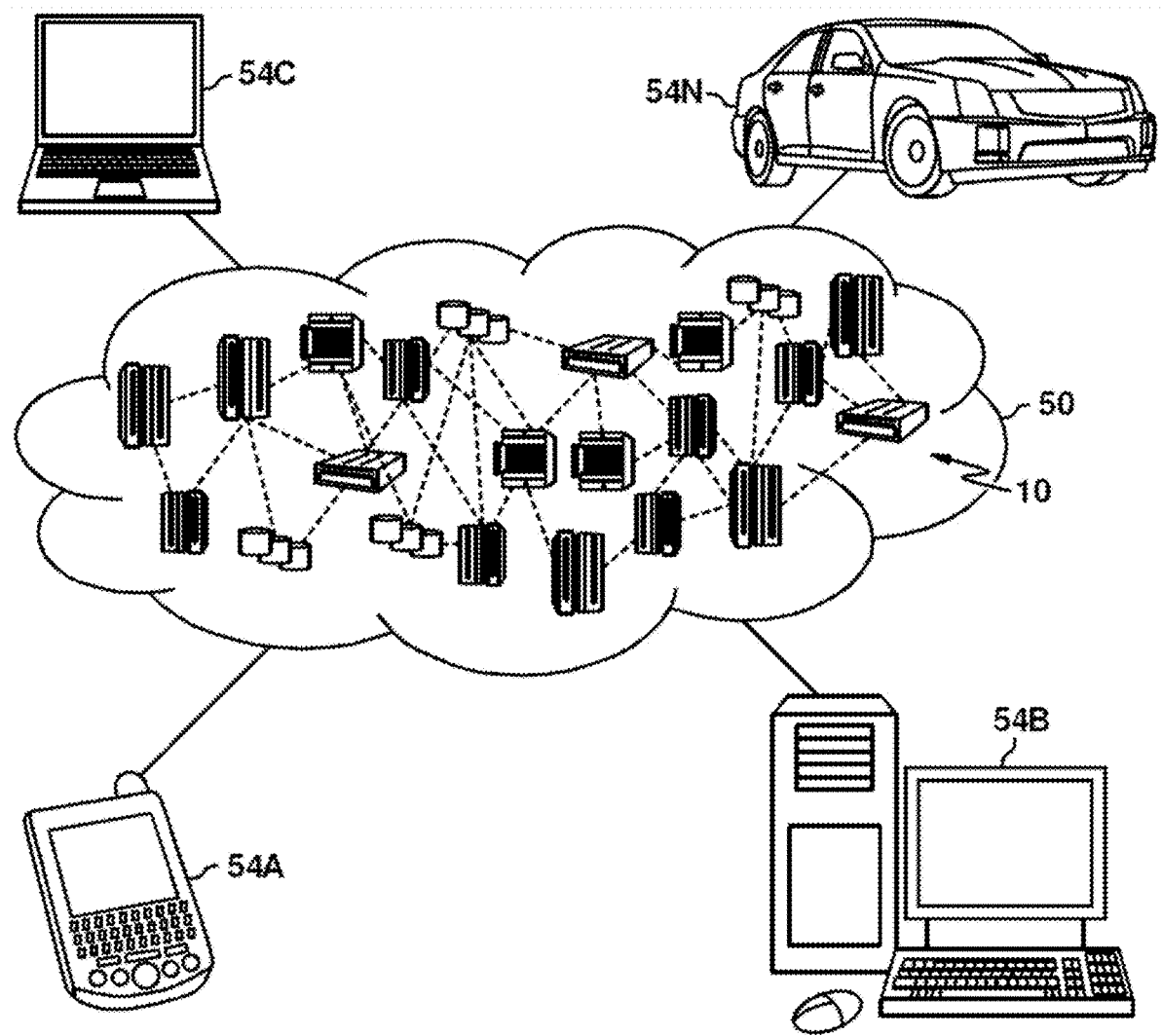
FIG. 1 depicts a cloud computing environment according to an embodiment of the present invention.

Embodiments of the present invention comprise a self-learning interactive user interface that is trained via methods of machine learning to answer natural-language user questions in a manner like that of a human respondent.

Machine-learning systems generally comprise a training module that "educates" a self-learning application by conducting training sessions in which the training component submits one or more specially formatted data repositories known as corpora to the self-learning application. Each corpus contains a recording of human interactions of the type that the self-learning application is designed to emulate.

During each training session, the self-learning application learns by example how to interpret different types of user input and how respond to each type of input in a human-like manner. The training sessions continue in this manner until the self-learning application has been exposed to enough human interaction to have "learned" how to properly respond to natural-language user input.

The present invention comprises machine-learning systems and methods that train a self-learning interactive user interface with corpora that contain question-answer pairs extracted from previously recorded human interactions. Over the course of numerous training sessions, the self-learning interface system learns by example from the question-answer pairs how to respond to a particular class of user questions in a human-like manner.

The present invention improves upon current machine-learning technologies, which comprise relatively simple tools for identifying and extracting question-answer pairs from heterogeneous extrinsic sources. The present invention instead provides improved systems and methods that convert extrinsic sources of training data into bitmap images and then use image-processing technologies to reconcile heterogeneous source file formats and data formats. Unlike known technologies, these systems and methods consider both structure (textural and other image-related characteristics of bitmap representations of the sources) and content (semantic meanings inferred from the text of each source). This allows the present invention to more accurately identify QAPs, regardless of a source's file format or data format, and to automatically represent the identified QAPs as vectors that may be loaded directly into a machine-learning corpus.

Image-processing procedures used by the present invention include steps of translating each source document into one or more grayscale bitmapped images; using Canny edge detection, morphological erosion and dilation, and contour detection to identify texturally consistent regions of each converted image; using a self-learning cognitive classification system to classify each identified region as containing question text, answer text, or non-textual content; using further cognitive analysis to organize the classified regions into question-answer pairs; characterizing the questions and answers with vectors that each information from which semantic meaning of a question or answer may be inferred; and loading the question-answer pairs and vectors into a machine-learning corpus that a machine-learning training component then uses to train the self-learning interface.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
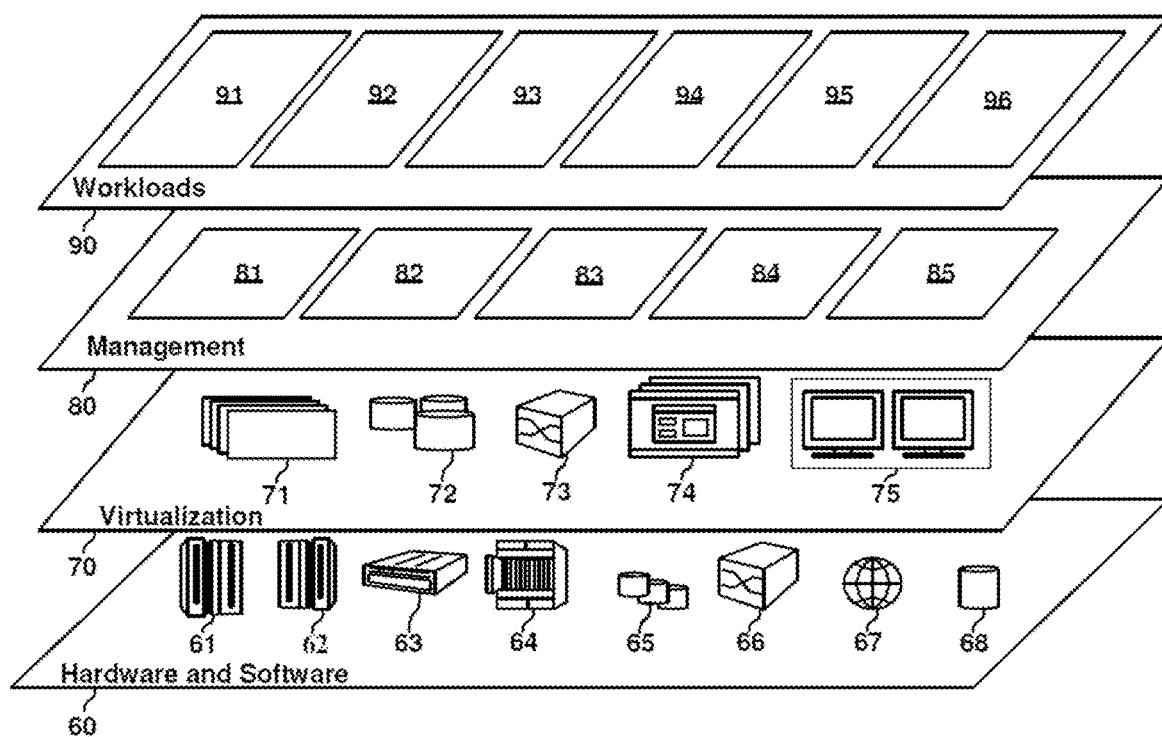
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex tasks related to a self-learning natural-language user interface.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
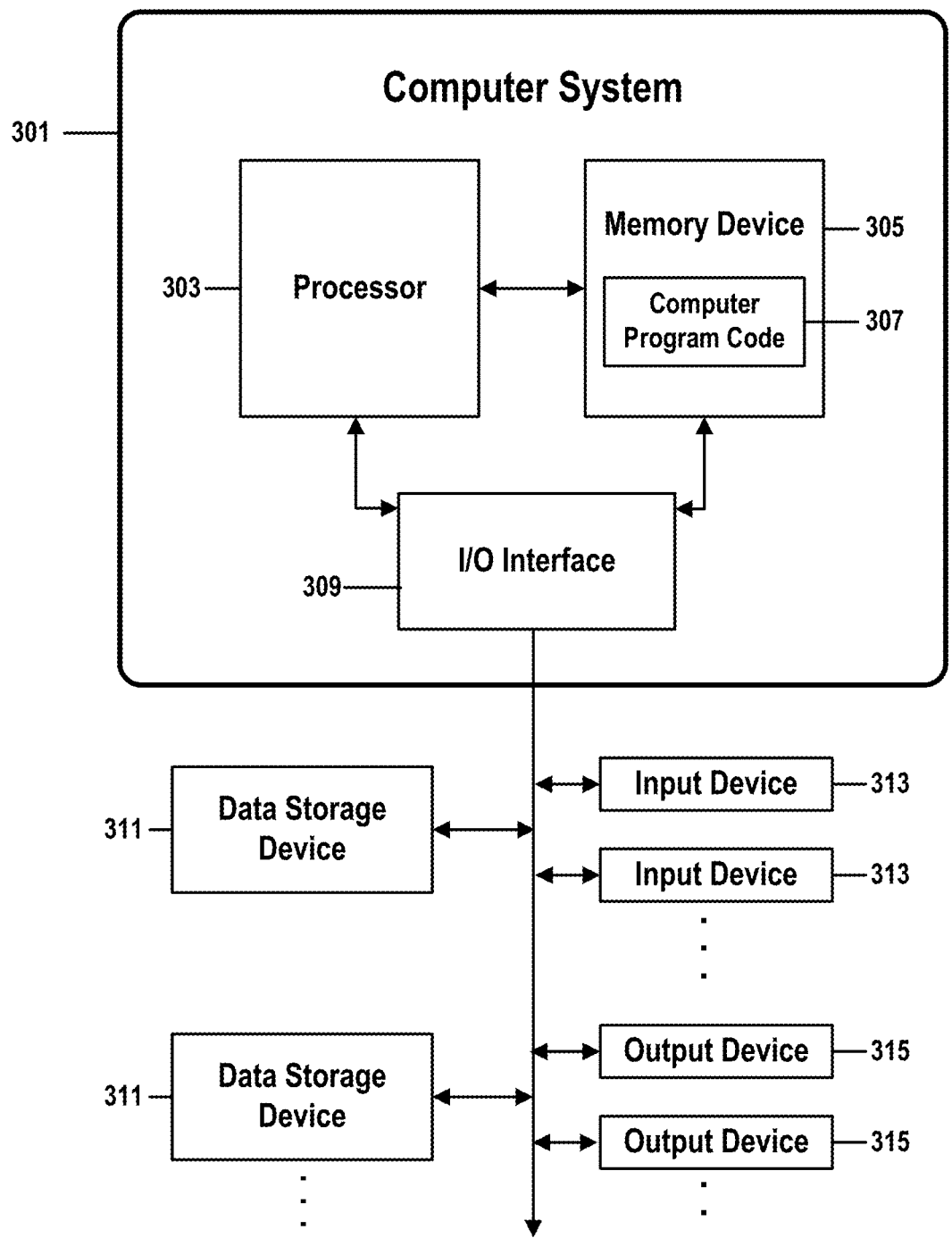
FIG. 3 shows the structure of a computer system and computer program code that may be used to implement a method for a self-learning user interface with image-processed QAP corpus in accordance with embodiments of the present invention.

FIG. 3 shows a structure of a computer system and computer program code that may be used to implement a method for a self-learning user interface with image-processed QAP corpus in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM). Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a self-learning user interface with image-processed QAP corpus in accordance with embodiments of the present invention, and may implement other embodiments described in this specification, including the methods illustrated in FIGS. 1-6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, where the code in combination with the computer system 301 is capable of performing a method for a self-learning user interface with image-processed QAP corpus.

Any of the components of the present invention could be created, integrated, hosted, maintained, deployed, managed, serviced, supported, etc. by a service provider who offers to facilitate a method for a self-learning user interface with image-processed QAP corpus. Thus the present invention discloses a process for deploying or integrating computing infrastructure, comprising integrating computer-readable code into the computer system 301, where the code in combination with the computer system 301 is capable of performing a method for a self-learning user interface with image-processed QAP corpus.

One or more data storage units 311 (or one or more additional memory devices not shown in FIG. 3) may be used as a computer-readable hardware storage device having a computer-readable program embodied therein and/or having other data stored therein, where the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a self-learning user interface with image-processed QAP corpus may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a self-learning user interface with image-processed QAP corpus is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4A:
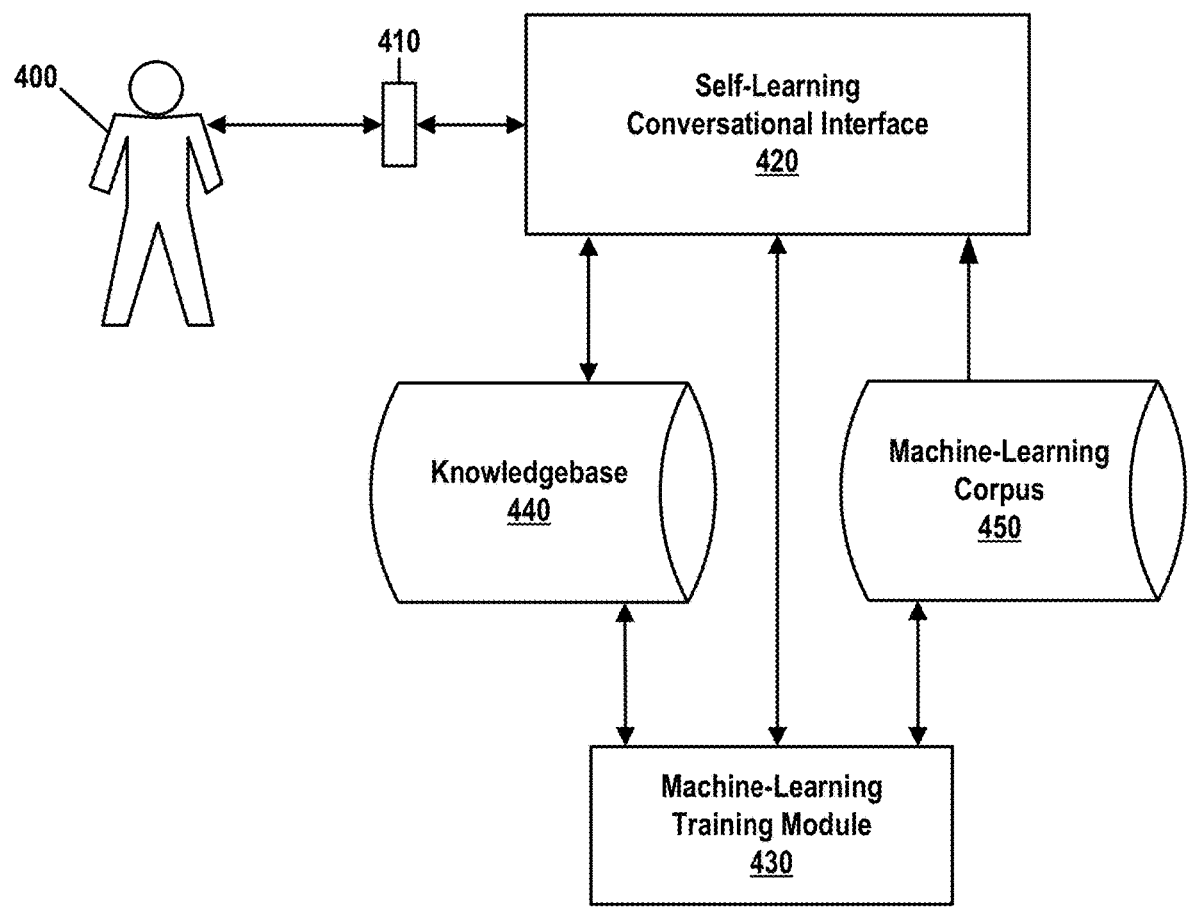
FIG. 4A shows a logical architecture of a self-learning user interface.

FIG. 4A shows a logical architecture of a self-learning user interface. FIG. 4A shows items 400-450.

In this implementation, a self-learning conversational user interface 420 interacts with a user 400 through a user device 410, such as a computer system, smartphone, interactive voice-response (IVR) system, or mobile device. The conversational interface 420 converses with the user by generating natural-language responses to user input. When fully trained, the responses produced by interface 420 may be difficult for the user 400 to distinguish from those of a human actor.

The conversational interface 420 determines how to respond to user input by referring to rules and other reference information stored in an information repository known as a knowledgebase 440. These rules tell the interface 420 how to infer semantic meaning from various types of known user inputs and how to respond to such inputs in a manner that emulates a human response.

Interface 420 gains this skill by analyzing repositories of actual human or humanlike interactions, noting how certain word combinations should be interpreted as questions, and how a human would normally respond to such questions. This information is submitted to the interface 420 during machine-learning training sessions managed by a training module 430. The information itself is submitted to interface 420 during a training session as a specially formatted data structure known as a corpus 450. Corpora 450 generally contain large numbers of logged or tracked human-to-human or human-to-expert system interactions that are each stored in a specialized format. Although a corpus 450 may store data in any format known in the art, most store each data instance in a standardized vector format.

In known machine-learning systems of this type, training data is not generally available from extrinsic sources in a format that is compatible with a vector format of a corpus 450. Converting logged data into a corpus-compatible format may require proprietary logging or parsing applications specially written for each source format and, in many cases, the output of such application further requires manual correction by a human expert.

During a typical machine-learning training session the self-learning interface 420 will gain an incremental bit of experience from each corpus transaction. As the interface 420 gains more experience, the interface 420 or the training module 430 updates the knowledgebase rules to better represent the interface 420's greater experience.

For example, a knowledgebase rule might instruct the interface 420 to respond to a user delivery-date request by stating average delivery times to the user's Zip code. If the training module 430 trains the interface 420 with a corpus 450 that contains interactions in which a human user responded to such a statement by then asking for an actual delivery date, then the interface 420 would update the knowledgebase rule to instruct interface 420 to respond to a delivery-date request with a date, rather than a mere statement of average delivery times.

A self-learning application may continue to gain experience in this way during repeated training sessions, with the goal of eventually learning so much about human conversational interactions that the application is able to respond to a user in a manner that is indistinguishable from that of a real human.

Figure 4B:
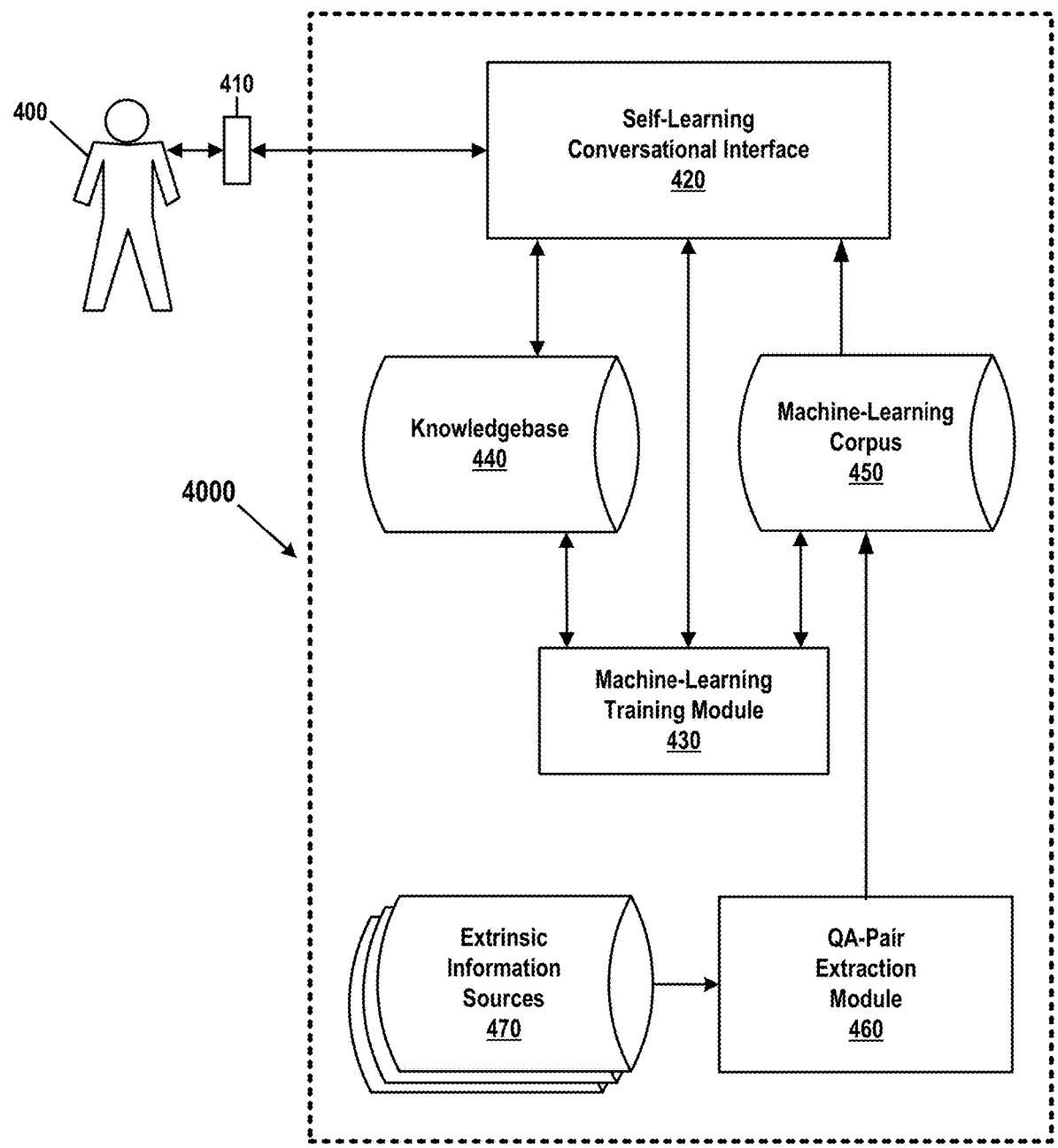
FIG. 4B shows a logical architecture of an improved self-learning user interface with image-processed QAP corpus in accordance with embodiments of the present invention.

FIG. 4B shows a logical architecture of an improved self-learning conversational user interface system 4000 with image-processed QAP corpus in accordance with embodiments of the present invention. FIG. 4B shows system 4000, which in turn comprises items 400-470.

Items 400-450 are similar in form and function to identically numbered items in FIG. 4A. Embodiments of the present invention add an automated QA-pair extraction module 460 that uses a novel procedure incorporating various image-processing tools to automatically extract question-answer pairs from extrinsic sources 470, where the automatically extracted information is configured in a format that is compatible with corpus 450.

These sources 470 may comprise any information repository, located either locally, at a remote site, or on the Internet. Such repositories 470 include records of human conversations that include questions and associated answers to those questions. Examples of such a repository include, but are not limited to, user questions about products or services on an e-commerce site, a recorded log of help-desk service calls, a logging utility of a customer-service chat facility, a social media Web site, an online publication or blog, and a business's internally generated recording of conversations between customers and either a human service representative or an expert system trained to emulate a human representative.

In this manner, QA-pair extraction module 460:

i) derives QA-pair training data from extrinsic sources 470 in a form compatible with corpus 450, regardless of each source's data format and content format;

ii) derives the training data without requiring custom parsing modules to be specially written for each source-data format;

iii) derives the training data without requiring manual human intervention to correct and revise the data; and iv) to then store the training data in corpus 450 such that the training data can later be used by the training module 430 to train the self-learning interface 420.

Figure 5:
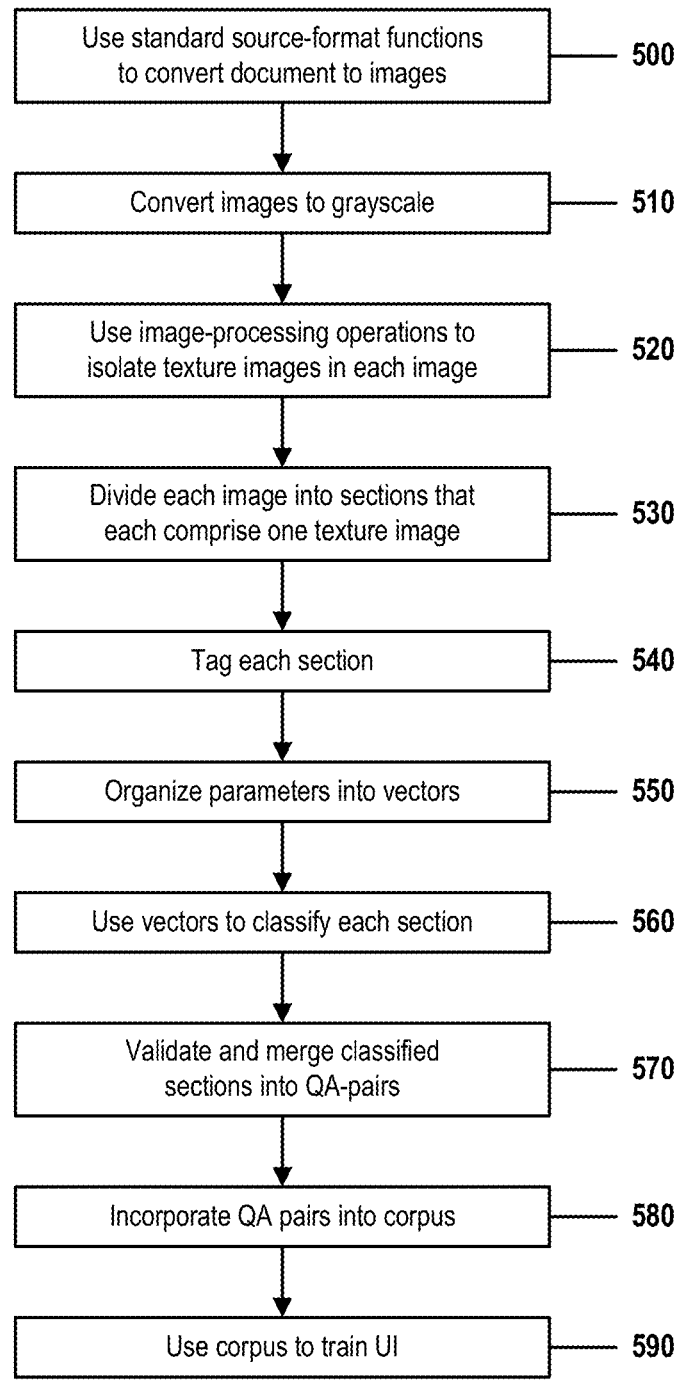
FIG. 5 is a flow chart that illustrates the steps of a method for a self-learning user interface with image-processed QAP corpus in accordance with embodiments of the present invention.

This procedure is described in greater detail in FIG. 5.

In some embodiments, the topology of the present invention may differ somewhat from the structure shown in FIG. 4B. For example, the QA-pair extraction module 460 may be configured as an internal component of training module 430. Such variations do not significantly alter the procedures described in FIG. 5, and are within the scope of the present invention.

FIG. 5 is a flow chart that illustrates the steps of a method for a self-learning user interface with image-processed QAP corpus in accordance with embodiments of the present invention. FIG. 5 contains steps 500-590, which may be performed by embodiments that incorporate the structures of FIGS. 1-3 and 4B.

In step 500, QA-pair extraction module 460 of self-learning user interface system 4000 begins processing one source of a set of extrinsic information sources 470. This procedure begins by converting the source into one or more image files or bitmap images, formatted in a standard graphics file format.

For example, an Adobe Acrobat .PDF file could be translated into a set of one-page .JPG files that conform to a Joint Photographic Experts Group compression standard, using a function analogous to Acrobat's built-in "Save as Image" function. Similarly, a word-processing document could be converted to a .JPG image by means of a "Save As" function of the word processor. Other types of sources could be converted to bitmap images through operating-system calls or API calls that perform functions similar to Windows' PrtScrn screen-capture operation.

The present invention is flexible enough to accommodate any known means preferred by an implementer for converting the source into a standard image format. The present invention is also flexible enough to accommodate any known image format, such as .JPG, .JPE, .TIF, .BMP, or .PNG.

In step 510, the system, by means known in the art, converts each image generated in step 500 to a grayscale color palette. This conversion simplifies computations and processing requirements comprised by subsequent steps and, because the present invention is primarily interested in processing text, does not sacrifice information necessary to produce meaningful output.

In step 520, the system uses a series of image-processing operations to segment each converted grayscale image into one or more disjoint sections or blocks, where the content of each block has coherent texture characteristics, such as a brightness range, pixel-intensity patterns, detail complexity, a degree of contrast, and average pixel density.

For example, a page of a newspaper might comprise fourteen disjoint texture regions: two that each comprise a grayscale photograph, eight that each comprise an unbroken segment of a column of body text, and four that each comprise a contiguous segment of a headline. Identifying texture regions comprised by an image generally requires identifying both the texture characteristics of each region of the image and identifying edges that bound each region of consistent texture characteristics.

In one embodiment, the series of image-processing operations comprises:

i) an edge-detection operation such as the known Canny edge-detection algorithm, which uses Gaussian filters to translate the grayscale image into a "texture image" that shows edges and other features of an image that characterize textures comprised by the image;

ii) morphological erosion and dilation, which mitigates anomalies like irregular edges and inconsistent line thicknesses that can occur during edge-detection, noise-filtering, color-palette conversion, bitmap generation, and other graphical operations;

iii) contour identification, performed by a standard tool like the OpenCV open-source "findContours" function, in order to identify contours or curves in the processed image that can be interpreted as boundaries of each texturally distinct region of the image.

Analogous procedures are used in the art to segment a graphic image or photograph into texturally distinct visual elements, in order to facilitate inferring semantic meanings from bit patterns in the image. For example, edge-detection and contour identification operations could be used to segment a beach scene into visual elements that each represent an area of sand, water, sky, or bathers. This would allow a downstream application to tag the visual elements with semantically meaningful labels, or to generate a three-dimensional version of the image in which each visual element is assigned a 3D depth.

Embodiments of the present invention adapt this procedure to mixed-media sources like the extrinsic information sources 470 described in FIG. 4B. Although the computational steps are similar to those known in the art, the segmenting produced by embodiments of the present invention, rather than isolating visual elements of a photograph, instead identifies regions of a text or mixed-media image that contain either blocks of text or non-textual graphical elements.

In one embodiment, an edge-detection operation identifies possible alphanumeric characters by outlining each character along an edge characterized by certain brightness discontinuities. This process can, however produce irregular or broken outlines if the previous grayscale conversion had blurred the characters' sharp edges. The morphological erosion and dilation procedures help restore the character outlines to their original shapes by smoothing irregular edges, repairing broken outlines, mitigating variations in line thickness, and performing other operations that make the character outlines more easily recognizable as text.

At the conclusion of step 520, the system will have segmented each converted grayscale image into a disjoint set of contiguous regions, where each region contains a particular texture image.

In step 530, the system divides each grayscale image into sections, where each section corresponds to one of the texture-image regions identified in step 520. An exemplary result of a performance of steps 520 and 530 is illustrated in FIG. 6.

Figure 6:
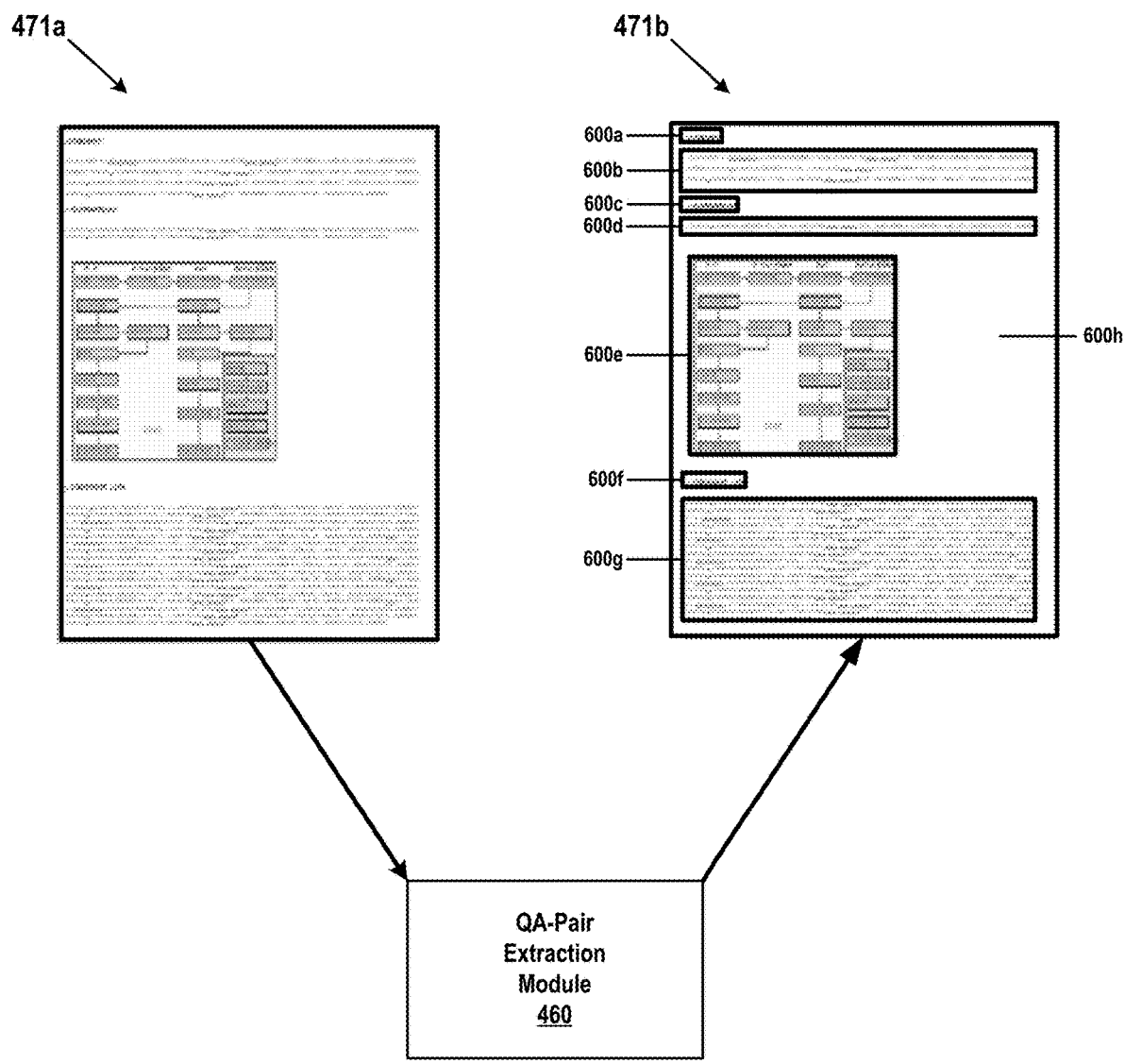
FIG. 6 shows how a grayscale image is segmented into disjoint, contiguous sections by the embodiments of the present invention.

FIG. 6 shows how a grayscale image is segmented into disjoint, contiguous sections by the procedures of steps 520 and 530. FIG. 6 shows items 460, 471a-471b and 600a-600h.

QA-pair extraction module 460 is identical in form and function to item 460 of FIG. 4B. As described in FIG. 5, extraction module 460 processes a grayscale image 471a, which is derived from one of the extrinsic information sources 470 through FIG. 5 steps 500-510.

In steps 520-530 of FIG. 5, the extraction module 460 (or another component of system 4000) identifies texture-image regions in grayscale image 471a and associates each region with a corresponding block or section 600a-600h of the resulting processed image 471b.

In the example of FIG. 6, the unprocessed grayscale image 471a contains mixed media that includes text, a flow chart, and a table. The extraction module 460 in step 520 uses image-processing function to determine that certain regions of unprocessed image 471 represent content that has characteristics of text, while other regions represent non-textual content.

At the conclusion of step 530, the extraction module 460 has identified eight sections or blocks of processed image 471b that each correspond to one identified texture. In this example, sections 600a, 600c, and 600a have been identified as containing headline text, sections 600b and 600d have been identified as containing body text, sections 600e and 600g have been identified as containing non-textual visual elements, and section 600h has been identified as containing blank space.

Returning to FIG. 5, step 540, for each processed grayscale image, the system intelligently tags each section of the image in order to associate semantic meanings with each section.

For example, the system in this step might tag a section of an image as containing media, such as a photograph, chart, or video clip, or might tag a section as containing question words, answer words, a blank area, or other structural feature of the image.

This step may be performed by any means known in the art. In certain embodiments, the tagging is performed by means of a cognitive or artificially intelligent process, such as a text analytics or semantic analytics procedure that infers semantic meaning from character or word patterns. In some embodiments, this step may be further facilitated by non-cognitive methods, such as by means of a pattern-matching algorithm or an optical-character recognition (OCR) function, a natural-language processing (NLP) component, or any other facilitating function known in the art, as desired by an implementer.

Such procedures may be trained by machine-learning methods to translate natural-language text into semantically meaningful tokens, tags, parametric values, or other meaningful values. For example, a section that contains one hundred alphanumeric characters organized into a pattern that appears to be a question, followed by two hundred alphanumeric characters organized into a pattern that appears to a paragraph of expository text could be associated in step 540 with a first tag that identifies the section as one-third question and a second tag that identifies the section as two-thirds answer.

Similarly, a section that contains mostly textureless white pixels could be associated with a tag that identifies that section as a blank area, and a section that contains what appears to be a photograph might be tagged as being media.

Some embodiments may be able to associate each section with more than one tag. The present invention is also flexible enough to accommodate any choice of tag parameters desired by an implementer. For example, one embodiment could allow tags to identify parameters that distinguish sections between photographs, drawings, charts, and video clips, while another embodiment could comprise a more limited parameter set that assigns simple "non-text" tags to every section that contains anything other than textual content.

In one example, an embodiment might associate each section with tags that specify values of five parameters: TextureComplexity, SectionType, BlankArea %, QuestionWords %, and AnswerWords %.

In this example, a first section, containing text that is 20% question, 60% answer, and 20% blank space would be associated with tags:

TextureComplexity=Moderate, SectionType=Text, BlankArea %=20, QuestionWords %=20, and AnswerWords %=60.

A second section, containing text that is 60% blank space and 40% text that appears to be a question would be associated with tags:

TextureComplexity=Lower, SectionType=Text, BlankArea %=60, QuestionWords %=40, and AnswerWords %=0.

And a third section that contains only a flow chart would be associated with tags:

TextureComplexity=Lower, SectionType=NonText, BlankArea/%=0, QuestionWords %=0, and AnswerWords %=0.

In step 550, the system, for each image, organizes the tags for that image into a vector. In the current running example, parametric values specified by the three sets of tags described above might be organized into three vectors:

Section 1: (Moderate, Text, 20, 20, 60),
Section 2: (Lower, Text, 60, 40, 0), and
Section 3: (Moderate, NonText, 0, 0, 0).

In other embodiments, each tag could express a parametric value as a simple numeric value. A SectionType parameter, for example, could be set any of the following values: 1 (blank space), 2 (body text), 3 (heading text), 4 (graphic), 5 (photographic image), 6 (hypertext link to remote content), or 7 (embedded video clip). Similarly, the pixel complexity of a section could be expressed by a value of the TextureComplexity parameter within a range of 1-10. In the running example, such a system might result in vectors:

Section 1: (4, 2, 20, 20, 60),
Section 2: (2, 2, 60, 40, 0), and
Section 3: (5, 4, 0, 0, 0).

The present invention is flexible enough to accommodate any choice of parameters and any selection of values for those parameters that are desired by an implementer.

In step 560, each section is classified and automatically labeled as a function of the vector associated with that section. A label may be any identifier desired by an implementer. For example, an embodiment that recognizes three labels: "Question," "Answer," and "Media," would label each section with one of these three labels, where the labels respectively identify a section as containing a natural-language question, a natural-language answer, or neither.

This labeling may be performed by a self-learning cognitive component of the QA-pair extraction module 430 or of another specialized component of system 4000. This self-learning cognitive component may be trained by known methods of machine-learning technology to associate certain patterns of parametric values with likelihoods that a vector identifies a section that should be associated with a certain label.

In the running example, the system may have learned that any vector that contains a TextureComplexity value less than 2 is unlikely to contain text and should be assigned a non-textual label, such as "Blank" or "Media." Similarly, the system may have learned that a vector containing a TextureComplexity value greater than 5, a QuestionWords % value less than 10, and an AnswerWords % value less than 10 has in the past most often contained a photographic image and should be assigned the label "Media," but not the label "Blank." The system may have also learned that any vector containing a QuestionWords % value greater than 70 should be labeled "Question."

Some embodiments may comprise vectors with larger numbers of parameters that identify a section's pixel-level characteristics and patterns and alphanumeric patterns in greater detail, or may specify characteristics of a subset of a section. For example, if a section appears to contain both question text and answer text, certain parameters may be set to identify which areas of the section contain questions and which areas of the section contain answers. In such cases, assigning a label to a section may require identifying and analyzing more complex or nuanced patterns.

Such analyses may become exceedingly complex, but are within the scope of current self-learning software technologies and may be performed with a high level of confidence if the labeling function has been adequately trained by means of known methods of machine-learning. This self-learning function should not, however, be confused with the self-learning aspect of the self-learning conversational interface 420, with learns how to converse with users through the distinct machine-learning mechanism described in FIG. 4B.

In certain embodiments, selected parameters will identify characteristics of question language that may be used to train the self-learning interface 420 how to recognize certain types of user questions. Similarly, other selected parameters will identify characteristics of answer language that may be used to train the self-learning interface 420 how to formulate proper humanlike responses to future user questions.

For example, a set of parameters may each identify the presence or absence of certain keywords or semantic patterns in a question, such as certain combinations of words like "price," "tax," "in stock," "shipping costs," "availability," "refund," or "overnight shipping." In another example, a set of parameters may each identify sentence structures or contexts that indicate a likelihood that the section contains a specific type of question. Such parameters might include combinations of phrases like "how much," "when," "how soon," "how do I configure," or "I have a discount code," or may identify specific combinations of certain types of textual content like dates, dollar amounts, or addresses. In all these examples, the system would represent a semantic meaning of a question as a sequence of parametric values organized into a vector.

Similar methods may be used to represent semantic meaning of a text that is interpreted as likely to be an answer. For example, a parameter may identify whether certain question text is repeated in a corresponding answer, or may identify a value that comprises the actual repeated text. A parameter may identify whether an answer includes a date, a dollar value, or a product code and another parameter may specify whether any of these values are associated with values of parameters of a vector associated with a corresponding question.

In some cases, a section may be labeled as containing a question-answer pair, rather than an isolated question or an isolated answer. In such embodiments, the QA-pair section may still be associated with a single vector, but that vector will contain parameters that describe characteristics of both the question and the answer.

At the conclusion of step 560, each section of each grayscale image will have been intelligently labeled as containing text comprising a user question, text comprising an answer to a user question, or content that is neither a question or an answer. Furthermore, a parametric description of the information comprised by each section will have been translated into a vector format suitable for direct incorporation into a machine-learning corpus. These vectors each describe characteristics of a question or an answer (or, in some embodiments, both) inferred from the information source from which the bitmapped grayscale images were derived. These vectors will have been formatted and organized, in accordance with principles of known machine-learning algorithms, in a configuration that allows them to be used to train the self-learning conversational interface 420 to converse with users 400 in natural language.

In step 570, the system performs a QA "validator" function that merges the classified sections into sequences of QA pairs. In one example, consider an ordered set of four grayscale images derived from a first extrinsic document. Each section comprised by these four images have been classified in step 560 as either Question, Answer, or Media sections, resulting in four ordered sets of sections: QQAQA, QAAQA, QAMAQA, and QMQA.

The system here reconciles redundant Q and A sections by validating the classifications generated in step 570 and merging, reclassifying, or deleting sections as necessary to organize the sections into a string of matched QA pairs. This procedure can be performed by following simple rules that state, for example, that: all Media-classified sections that are not part of a QA-pair sequence should be deleted; a Media-classified section that occupies a position that should be occupied by a Q section or an A section of a QA pair should be reclassified to an appropriate Q or A classification; or a pair of adjacent Q sections or adjacent A sections in an otherwise proper sequence of QA pairs should be merged into a single Q or A section.

In some embodiments, these validation procedures may be performed by a cognitive, artificially intelligent, or self-learning component of QA-pair extraction module 460 or machine-learning training module 430.

The cognitive or non-cognitive rules applied in step 570 are distinguishable from rules comprised by previous steps of FIG. 5 in that the system in step 570 attempts to organize sections into QA pairs from a different perspective than that considered in the previous steps. In previous steps, the system attempts to classify each section independently, based on each section's content, texture, and other characteristics. Here, however, the system attempts to determine whether the resulting sequences of classifications have resulted in consistent QA-pair pattern. If a sequence does not conform to a QAQAQA . . . order, the system applies rules that attempt to reclassify individual sections based on this analysis of the sequential order of section classifications.

Certain embodiments might apply more sophisticated or complex rules in this step, where, upon detecting that a sequence of section classifications deviates from a QA-pair format, reconsiders internal characteristics of certain sections. For example, upon finding a QQA sequence, the system might review information stored in the vectors associated with each section. If the system finds that both Q sections contain a high proportion of question-related keywords and no answer-related keywords, and that the A section contains no question-related keywords and a moderate proportion of answer-related keywords, then a rule could direct the system to merge the two Q sections into a single section classified as containing Question content.

Many other ways of performing the mechanics step 570 are known in the art, including those associated with a machine-learning application, but in all cases, the validation operations of step 570 are performed as functions of patterns of section-classification sequences.

In the above example, the four sequences of sections would be organized in this step into QA pairs by merging or deleting nonconforming sections. Depending on details of the rules that govern the validation operations, the four sequences might be reorganized in the following manner:

Sequence 1: QQAQA→QAQA (the two Question sections are merged into a single Q-classified section; in some embodiments this action is chosen only after analyzing the vectors associated with at least the two Question sections)

Sequence 2: QAAQA→QAQA (the two Answer sections are merged into a single A-classified section; in some embodiments this action is chosen only after analyzing the vectors associated with at least the two Answer sections)

Sequence 3: QAMAQA→QAQA (the Media-classified section is deleted and the two Answer sections that had been adjacent to the Media section are merged into a single A-classified section; in some embodiments this action is chosen only after analyzing the vectors associated one or more sections)

Sequence 4: QMQA→QAQA (the Media-classified section is reclassified as an Answer section; in some embodiments this action is chosen only after analyzing the vectors associated with at least the Media section).

In some cases, it may be necessary to revise one or more vectors to more accurately characterize a merged section. In one example, a pair of adjacent Q sections, each of which is characterized by a corresponding vector, are merged into a single merged Q section. The first section's vector identifies that the first section contains seven question-related linguistic patterns, and the second section's vector identifies that the second section contains the same seven patterns, as well as and an eighth question-related pattern not comprised by the first section. The resulting merged Q section might than be associated with a vector identifying that the merged section contains all eight linguistic patterns.

If desired by an implementer, an embodiment will not update vectors when merging sections, allowing the merged section to inherit a vector that had been associated with one of the parent sections. In other cases, a set of vectors associated with sections of a QA pair may themselves be merged, resulting in one vector for each QA pair of merged sections. Other rules and procedures for maintaining vectors may be adopted by implementers as desired.

At the conclusion of step 570, the system will have generated an ordered sequence of sections comprised by each extrinsic source document, where the classifications of each sequence are ordered in QA-pair order. Internal characteristics, from which may be inferred semantic meaning, will have been stored in a set of vector, where each vector stores identifications of characteristics of one section in a format that is compatible with machine-learning corpus 450.

In step 580, the QA-pair extraction module 460, or another component of the self-learning interface system 4000, stores the generated vectors in the machine-learning corpus 450. No format or data conversion is necessary to perform this operation because the vectors will already be in a format that is compatible with a corpus. The vectors are stored in the corpus 450 in an order that corresponds to the QA-pairing derived in step 570.

In step 590, the training module 430 conducts a training session in which information stored in corpus 450 is used to teach self-learning conversational interface 420 how to interpret user questions and how to appropriately respond to those questions.

As is known in the field of machine-learning technology, the training module 430 submits each QA-pair of vectors to the self-learning interface 420 in order to teach interface 420 how to respond to particular types of questions in a conversational manner. During these training sessions, the interface 420, training module 430, or other component of the interface system 4000 infers rules from the examples comprised by each QA-pair of vectors and stores those rules in a knowledgebase 440.

Because each vector contains information from which may be inferred semantic meanings of a question or answer, self-learning interface 420 gains a little more experience with consideration of each QA pair. Eventually, after processing an adequate volume of QA pairs in this manner, the interface 420 gains the ability to respond to various types of questions in a humanlike manner.

In some embodiments, the procedure of FIG. 5 can be repeated periodically for numerous extrinsic information sources 470 in order to continuously update the self-learning interface 420 with examples culled from the latest recorded question-answer sessions.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A computerized system comprising a processor, a memory coupled to the processor, and a computer-readable hardware storage device coupled to the processor, the storage device containing program code configured to be run by the processor via the memory to implement a method for a self-learning natural-language user interface with an image-processed corpus, the method comprising:

the system identifying a grayscale image representing at least part of a source document, where the source document comprises a record of natural-language conversation comprising questions and answers;

the system segmenting the identified image into a set of blocks, where each block of the set of blocks is characterized by an image texture;

the system associating each block of the set of blocks with a corresponding vector,
where each vector comprises values of one or more parameters, and
where each parameter of the one or more parameters identifies a characteristic of the source document that is capable of being represented by a block of the set of blocks;

the system classifying each block of the set of blocks as a Question block, an Answer block, or a non-textual block;

the system organizing the classified blocks into an ordered sequence of question-answer pairs (QAPs), where each pair of the sequence comprises an initial block that has been classified as a Question block and that represents a natural-language question, and a terminating block that has been classified as an Answer block and that represents a natural-language answer to the natural-language question;

the system storing the vectors in a machine-learning corpus; and the system using the machine-learning corpus to train the self-learning natural-language user interface.

2. The system of claim 1, where the segmenting is performed by a sequence of image-processing operations that identify textures, edges, and contours comprised by the grayscale image.

3. The system of claim 2, where the sequence of image-processing operations comprises an edge-detection operation that transforms the identified image into a texture image, followed by morphological erosion and dilation operations that improve accuracy of pixel patterns that represent alphanumeric characters, followed by a contour-finding operation that identifies boundaries of each block.

4. The system of claim 1, further comprising:
the system generating the grayscale image by removing color information from a received snapshot image
where the snapshot image is a bitmapped representation of a subset of the source document, and
where the snapshot image was generated by an application that maintains and displays the source document in the source document's native format.

5. The system of claim 1, where associating a first block of the set of blocks with a corresponding first vector is a cognitive operation that further comprises:
identifying any alphanumeric characters represented by bit patterns comprised by the first block; and
if any alphanumeric characters are identified:
inferring a semantic meaning from the any identified alphanumeric characters; and
selecting values of the corresponding first vector as a function of the inferred semantic meaning.

6. The system of claim 1, where the classifying a first block of the set of blocks is a cognitive function that further comprises:
inferring, from values stored in a corresponding first vector, associated with the first block, whether information represented by the corresponding block represents a natural-language question, a natural-language answer, or neither a natural-language question nor a natural-language answer.

7. The system of claim 1, where the organizing comprises at least one task selected from the group consisting of:
merging two or more blocks of a subset of the set of blocks into a single block, such that the remaining blocks of the subset are organized into a series of question-answer pairs, and
deleting one or more blocks of the subset of the set of blocks, such that the remaining blocks of the subset are organized into a series of question-answer pairs.

8. The system of claim 1, further comprising:
the system identifying that the organizing has altered a first block of the set of blocks, where the first block was originally associated with a corresponding first vector; and
the system revising the corresponding first vector,
where that the revised corresponding first vector identifies a characteristic of the source document that is represented by an organized block of the set of blocks, and
where the organized block corresponds to the revised corresponding first vector after completion of the organizing.

9. A method comprising:
a self-learning natural-language user interface system identifying a grayscale image representing at least part of a source document, where the source document comprises a record of natural-language conversation comprising questions and answers;

the system segmenting the identified image into a set of blocks, where each block of the set of blocks is characterized by an image texture;

the system associating each block of the set of blocks with a corresponding vector,
where each vector comprises values of one or more parameters, and
where each parameter of the one or more parameters identifies a characteristic of the source document that is capable of being represented by a block of the set of blocks;

the system classifying each block of the set of blocks as a Question block, an Answer block, or a non-textual block;

the system organizing the classified blocks into an ordered sequence of question-answer pairs (QAPs), where each pair of the sequence comprises an initial block that has been classified as a Question block and that represents a natural-language question, and a terminating block that has been classified as an Answer block and that represents a natural-language answer to the natural-language question;

the system storing the vectors in a machine-learning corpus; and the system using the machine-learning corpus to train the self-learning natural-language user interface.

10. The method of claim 9,
where the segmenting is performed by a sequence of image-processing operations that identify textures, edges, and contours comprised by the grayscale image, and
where the sequence of image-processing operations comprises an edge-detection operation that transforms the identified image into a texture image, followed by morphological erosion and dilation operations that improve accuracy of pixel patterns that represent alphanumeric characters, followed by a contour-finding operation that identifies boundaries of each block.

11. The method of claim 9, where associating a first block of the set of blocks with a corresponding first vector is a cognitive operation that further comprises:
identifying any alphanumeric characters represented by bit patterns comprised by the first block; and
if any alphanumeric characters are identified:
inferring a semantic meaning from the any identified alphanumeric characters; and
selecting values of the corresponding first vector as a function of the inferred semantic meaning.

12. The method of claim 9, where the classifying a first block of the set of blocks is a cognitive function that further comprises:
inferring, from values stored in a corresponding first vector, associated with the first block, whether information represented by the corresponding block represents a natural-language question, a natural-language answer, or neither a natural-language question nor a natural-language answer.

13. The method of claim 9, where the organizing comprises at least one task selected from the group consisting of:
merging two or more blocks of a subset of the set of blocks into a single block, such that the remaining blocks of the subset are organized into a series of question-answer pairs, and
deleting one or more blocks of the subset of the set of blocks, such that the remaining blocks of the subset are organized into a series of question-answer pairs.

14. The method of claim 9, further comprising:
the system identifying that the organizing has altered a first block of the set of blocks, where the first block was originally associated with a corresponding first vector; and
the system revising the corresponding first vector,
where that the revised corresponding first vector identifies a characteristic of the source document that is represented by an organized block of the set of blocks, and
where the organized block corresponds to the revised corresponding first vector after completion of the organizing.

15. The method of claim 9, further comprising providing at least one support service for at least one of creating, integrating, hosting, maintaining, and deploying computer-readable program code in the computer system, where the computer-readable program code in combination with the computer system is configured to implement the identifying, the segmenting, the associating, the classifying, the organizing, the storing, and the using.

16. A method comprising:
receiving a source document bitmap with the bitmap including a representation of natural language text that includes at least a first question and a first answer, with the first answer being responsive to the first question;
dividing the source document bitmap into a plurality of blocks based upon an analysis of image textures of various portions of the source document bitmap;
determining that a first block of the plurality of blocks includes a representation of a first question;
determining that a second block of the plurality of blocks includes a representation of an answer to the first question;
determining a first vector for the first block, with the first vector including a plurality of parameter values;
determining a second vector for the second block, with the second vector including a plurality of parameter values;
organizing the first block and the second block into a first question-answer pair (QAP);
storing the first QAP, and its associated first and second vectors, in a machine-learning corpus; and
training a machine learning system based, at least in part, upon the first QAP, the first vector and the second vector.

17. The method of claim 16 wherein the analysis of image textures includes a determination of values, for various portions of the source document bitmap, of the at least the following image characteristics: brightness range, pixel-intensity patterns, detail complexity, degree of contrast and average pixel density.

18. The method of claim 16 wherein:
the first vector includes at least the following parameter values: texture complexity, section type, proportion of blank area, proportion of question words and proportion of answer words; and
the second vector includes at least the following parameter values: texture complexity, section type, proportion of blank area, proportion of question words and proportion of answer words.

19. The method of claim 16 wherein:
the analysis of image textures includes a determination of values, for various portions of the source document bitmap, of the at least the following image characteristics: brightness range, pixel-intensity patterns, detail complexity, degree of contrast and average pixel density;
the first vector includes at least the following parameter values: texture complexity, section type, proportion of blank area, proportion of question words and proportion of answer words; and
the second vector includes at least the following parameter values: texture complexity, section type, proportion of blank area, proportion of question words and proportion of answer words.

* * * * *